(12) United States Patent
Singh et al.

(10) Patent No.: US 11,006,293 B1
(45) Date of Patent: May 11, 2021

(54) DYNAMIC MANAGEMENT OF MOBILE COMMUNICATIONS NETWORK

(71) Applicant: T-Mobile USA, Inc., Bellevue, WA (US)

(72) Inventors: Amardeep Singh, Bothell, WA (US); Kareem Elhakim, Walnut Creek, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/880,677

(22) Filed: May 21, 2020

(51) Int. Cl.
*H04W 24/04* (2009.01)
(52) U.S. Cl.
CPC .................. *H04W 24/04* (2013.01)
(58) Field of Classification Search
CPC .................................................... H04W 24/04
See application file for complete search history.

(56) References Cited

U.S. PATENT DOCUMENTS

2017/0006502 A1\* 1/2017 Pham .................... H04W 28/18

\* cited by examiner

*Primary Examiner* — Kabir A Timory
(74) *Attorney, Agent, or Firm* — Han Santos, PLLC

(57) ABSTRACT

Methods for configuring a cellular telecommunication network are disclosed. A radio frequency (RF) configuration of a selected base station is adjusted to a predetermined setting. A baseline signature is determined based on a plurality of key performance indicators (KPIs). A characteristic of the RF configuration is changed to an updated setting. An updated signature is determined based on measurements of the KPIs after the characteristic is adjusted. The baseline signature and updated signature are analyzed to determine a composite difference profile based on the adjusted characteristic. It is determined that the composite difference profile represents a net improvement in performance of the cellular communication network based on one or more criteria and the adjusted characteristic is maintained as part of a new baseline configuration.

20 Claims, 5 Drawing Sheets

DYNAMIC MANAGEMENT OF MOBILE COMMUNICATIONS NETWORK

BACKGROUND

Wireless telecommunication networks have evolved into complex systems that include various hardware that is often controlled with complex software via a central station. To accommodate the increasing demand of such wireless services, large scale wireless telecommunication networks often include an increasing number of cell sites, sometimes referred to as base stations, which are used to service mobile devices in various locations. Radio spectrum is one resource that is managed in wireless communications networks when implementing various wireless technologies such as 3G, 4G, and 5G. An operator of a wireless communication network is typically licensed to operate within specific bandwidth ranges, where a license may designate one or more air-interface technologies that may be used within the specific bandwidth range. For example, a Long-Term Evolution (LTE) air-interface technology may be licensed to operate at various frequencies, inter alia, between 700 MHz and 2,700 MHz. Various characteristics that affect the use of the radio spectrum may be changed by the wireless communication network. It is desirable for the wireless communication network to make efficient use of the available spectrum.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
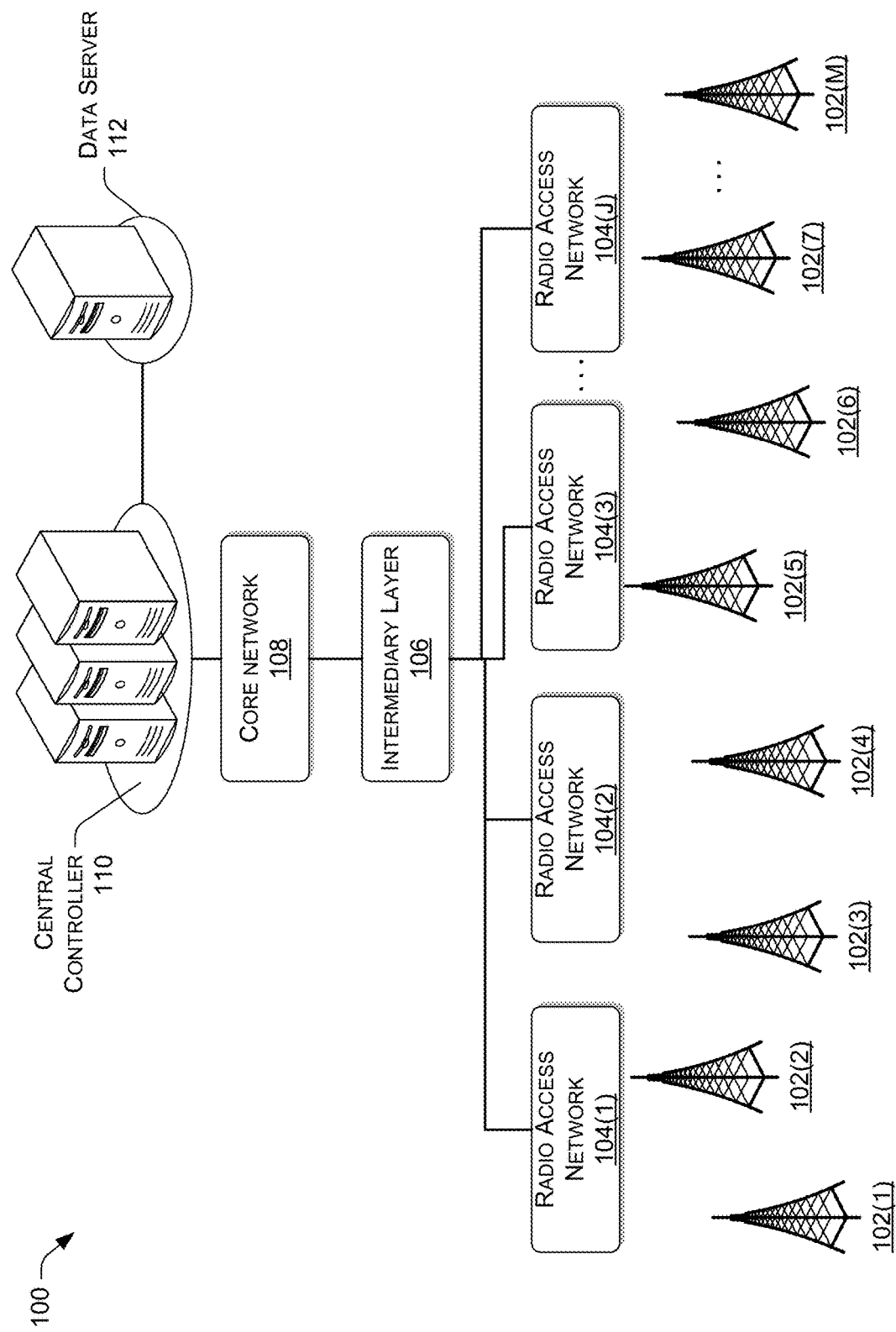
FIG. 1 is an example architecture for implementing a wireless network system.

Various components of a wireless telecommunication network may be controlled to effect changes in radio frequency (RF) characteristics, frequency allocation, and the like. Efficient spectral management is an important component of providing services to a large subscriber base, in particular when the available spectrum is limited. Spectral management may include, for example, parameter tuning, footprint optimization, or radio frequency (RF) shaping.

A base station typically employs one or more frequency bands, which may be referred to as "layers" for physically transmitting and receiving radio signals to/from the user equipment (UE), which are also referred to as user devices or client devices. Various parameters pertaining to the layers may be optimized for improving network performance and the user experience.

The present disclosure describes techniques for dynamically adjusting layer parameters for base stations, such as the power allocation proportion ratio between the layers used by the base stations. Other layer parameters may include channel bandwidth used by the layers, modulation schemes used by the data transmitted, etc. A spectrum of Key Performance Indicators (KPIs) measured from various parts of the network, including some KPIs measured at the base station, may be monitored to determine the network performance as the layer parameters are adjusted. Incremental changes may be made to the layer parameters to keep the network under an optimized condition in response to changing traffic and other variables.

A number of layer parameters that affect RF characteristics of base stations may be remotely changed by a network management controller or function of the wireless telecommunication network. While it may be possible to manually determine the effects of a change in a layer parameter, the process may be time intensive due to the effort required to collect data from the network configuration or to manually perform an analysis of the collected data. When such efforts are costly or difficult, the evaluation of adjustments that can improve the network performance can be delayed or not performed, which can result in inefficient layer management which in turn may negatively affect the user experience. Some wireless telecommunication networks implement an automated configuration scheme. For example, some networks may implement a self-organizing network or self-optimizing network (SON) to automate aspects of the configuration, management, optimization and healing of the network. The benefits of the automation of network configuration may be limited when the ability to dynamically adjust layer parameters is hindered.

The disclosed technologies represent a substantial advantage over existing systems where inaccurate or limited analysis can prevent or mitigate efficient modification and improvement of network performance, or where manual efforts are required to determine whether a change to a layer parameter results in an overall improvement in the wireless telecommunication network. These shortcomings may exacerbate network resource issues including the overuse of network and computing resources. It can be appreciated, therefore, that the disclosed technologies represent a substantial advance toward reducing the waste of processor and network usage associated with providing applications and functions in networks such as a wireless telecommunication network.

Various embodiments are disclosed for dynamically adjusting layer parameters for base stations and collecting data for one or more KPIs to determine network performance as the layer parameters are adjusted. In one embodiment, a central controller may initiate a command to modify a layer parameter. Prior to modifying the layer parameter, a baseline set of data of network metrics may be collected and analyzed to determine a baseline profile. After the layer parameter is modified, a second set of network metrics may be collected and analyzed and compared to the baseline profile to determine if the modification resulted in a significant characteristic change after the layer parameter was changed.

In some embodiments, one or more KPIs may be collected and analyzed. For example, the KPIs may be evaluated to maintain a threshold Quality of Service (QoS) for a subset of communication transmissions. The QoS may relate to packet loss, latency, jitter, echo, downlink throughput, uplink throughout, or any combination thereof. In some examples, performance objectives may be based on user priority, device priority, service priority, RAN priority, or any combination thereof. User priority may correspond to subscriber status within a telecommunication network; device priority may correspond to a class of devices (i.e.

computers, casting devices, mobile devices, gaming device, television units, and/or so forth); and, service priority may correspond to a class of services (i.e. downloading data, streaming multimedia, VoIP, VioIP, communication transmissions associated with predetermined user applications, and/or so forth) or power optimization criteria. The KPIs may be associated with cell sites of interest or may be system or network wide KPIs. For example, a KPI may measure the Average Connected Users or UE Downlink (DL) Throughput.

In some embodiments, the layer parameter changes may be performed during low traffic time periods to minimize the impact on users. In one embodiment, the change may be determined based on a predetermined threshold or some other numerical or statistical limit. In some embodiments, an algorithm such as a K-Means Clustering Algorithm may be implemented to determine significant changes resulting from layer parameters. For example, KPIs may be collected and analyzed to identify traffic changes related to the layer parameter changes. In one example, it can be determined if cell by cell coverage is observed as becoming weaker or stronger during a predetermined time period. Increasing a parameter such as power allocation proportion ratio may cause coverage to become weaker or lost and decreasing the power allocation proportion ratio may cause the coverage to become stronger, thereby causing interference.

The adjustment of layer parameters allows network operators to optimize the layer utilization to improve data throughput and call quality of the wireless telecommunication network. The adjustment of layer parameters may further allow a SON controller to automatically monitor and improve network performance. For example, the SON controller may automatically adjust power ratios to improve frequency utilization. The SON controller may also, for example, automatically change the power ratios to fill in coverage holes due to various network events The SON controller may also make adjustments for load balancing. Multiple layer parameters may be changed in combination, and the impact of the changes can be evaluated using multiple KPIs. Such changes may be automatically implemented and analyzed and thus save many hours of manual engineering effort. Such changes may also be implemented and analyzed substantially in real time, allowing for greater responsiveness to changing network conditions. The layer parameters may also be adjusted and evaluated over arbitrary geographical areas and using multiple cells, allowing for coordination between cells. The techniques described herein may be implemented in a number of ways. Example implementations are provided below with reference to the following figures.

FIG. 1 is an example architecture for implementing a wireless network system in accordance with the disclosed embodiments. Cell sites 102(1) to 102(M) may be configured and managed by a central controller 110. The cell sites may be configured individually or by clusters. The wireless telecommunication network 100 may include a plurality of hardware, software, and other infrastructure components that may be typical of a large wireless telecommunications provider. The cell sites 102(1) to 102(M) may be associated with a radio access networks (RANs) 104(1) to 104(J) used for mobile communications. The cell sites 102(1) to 102(M) may be located across different geographic areas to facilitate providing network access and connectivity to users in their corresponding geographic area. The cell sites 102(1) to 102(M) may be base stations, or other network end points (or possibly intermediary points) that exchange communications with user devices, such as mobile telecommunication devices, computing devices, or other devices that have wireless connectivity.

In accordance with one or more embodiments, the wireless telecommunication network 100 may conform to Universal Mobile Telecommunications System (UMTS) technologies that employ UMTS Terrestrial Radio Access Network (UTRAN). In some instances, the UTRAN may share several components like a Circuit Switch (CS) and a Packet Switch (PS) core network with a GSM EDGE Radio Access Network (GERAN) (Global System for Mobile Communications (GSM), Enhanced Data rates for GSM Evolution (EDGE)). In various instances, a 4G long term evolution (4G/LTE) network that comprises Evolved UMTS Terrestrial Radio Access Network (EUTRAN) may be employed to transmit data for the telecommunications networks, besides UMTS or GSM. Thus, EUTRAN, UTRAN and GERAN networks (and other possible RANs) may coexist to process telecommunications traffic.

In some instances, communications may be handed off between EUTRAN, UTRAN and GERAN networks (or other networks) and still maintain a communication with a common core network, such as when a UE leaves a range of access (zone) of a EUTRAN and enters a range of access of a UTRAN or GERAN. Handoffs may also occur between different types of hardware (e.g., different manufacturers, versions, etc.,) for a same network type (e.g., EUTRAN, UTRAN, GERAN, etc.). For discussion purposes, it will be assumed that the architecture of FIG. 1 represents a 4G/LTE network that includes one or more evolved Node B's (eNodeB's), represented herein by cell sites 102(1) to 102(M), which provide an interface between a UE, such as a wireless handheld device that is configured to communicate over the radio access network 104(1) to 104(J) and the core network 108. Each eNodeB couples with the core network 108 via the mobility management entity (MME), represented by the intermediary layer 106, which is a control-node.

In accordance with one or more embodiments, other types of networks, RANs, and/or components (hardware and/or software) may be employed that enable telecommunications devices to communicate with the core network 108 to facilitate activities such as voice calling, messaging, emailing, accessing the Internet, or other types of data communications. For example, the wireless telecommunication network 100 may be, at least in part, a Wi-Fi based network, a Bluetooth network, or other type of wireless network.

The wireless telecommunication network 100 may include a central controller 110 to manage network performance optimizations for each cell cite and/or cell site clusters. In some embodiments, the central controller may include a self-organizing network or self-optimizing network (SON) controller. The central controller 110 may be in communication with one or more of the various components of the wireless telecommunication network 100, such as the core network 108, the one or more intermediary layers 106, the RANs 104(1) to 104(J), and/or the cell sites 102(1) to 102(M). The central controller 110 may further be configured to send commands to adjust one or more layer parameters at cell sites 102(1) to 102(M). The cell sites 102(1) to 102(M) may comprise one or more antennas. The antennas may comprise a single antenna, multiple antennas, an array of antennas, a phased antenna array, or the like. The antennas may be mounted to, or otherwise controllable by, an antenna positioner configured to change a beam direction from the antenna by altering a physical position of the antenna or altering the RF characteristics of the antenna.

In one embodiment, the wireless telecommunication network 100 includes a data server 112 that is configured to provide information related to the performance of each cell site individually, clusters of cell sites, or over the entire network. Such information may include, for each cell site, a baseline information of KPI's, historical information regarding the KPI's, trend information of the KPI's, etc. In some embodiments, the data server 112 provides some of the aforementioned information or additional performance information to the central controller 110.

In some embodiments, the central controller 110 may monitor network traffic at the base station nodes in real-time, or near real-time, to determine whether to dynamically adjust layer parameters within a cell of a base station node. The central controller 110 may receive network traffic data from a base station node, analyze the network traffic data, and determine a bandwidth requirement within each base station node that is required to accommodate the real-time network traffic. Further, the central controller 110 may determine that the available bandwidth is less than the corresponding bandwidth requirement. In doing so, the central controller 110 may generate layer parameter data to adjust a layer parameter within a cell of a base station node. The layer parameter data may include computer-executable instructions that cause a base station node to adjust a layer parameter.

Client device(s) may include any sort of electronic device operating in a telecommunication network. The client device(s) may include a cellular phone, a smartphone, a tablet computer, an electronic reader, a media player, a gaming device, a personal computer (PC), a laptop computer, and/or so forth. The client device(s) may have a subscriber identity module (SIM), such as an eSIM, to identify the respective electronic device to a telecommunications service provider (also referenced to herein as "telecommunications network").

The central controller 110 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the base station node 104, via the one or more network(s) 108.

The one or more network(s) 108 may include public networks such as the Internet, private networks such as an institution and/or personal intranet, or some combination of private and public networks. The one or more network(s) can also include any type of wired and/or wireless network, including but not limited to local area network(s) (LANs), wide area networks (WANs), satellite networks, cable networks, Wi-Fi networks, Wi-Max networks, mobile communication networks (e.g. 3G, 4G, LTE, 5G NR, and/or so forth), or any combination thereof.

Moreover, the telecommunication network may provide telecommunications and data communications in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5G New Radio (5G NR), CDMA-2000 (Code Division Multiple Access 2000), and/or so forth. The exemplary architecture 100 may include a core network that may provide telecommunication and data communication services to multiple computing devices, such as a 3G-compatible computing device and an LTE an LTE-compatible computing device, collectively referred to as computing device(s). The telecommunication network may include a core network that may provide telecommunication and data services to multiple computing devices, such as client device(s).

In various examples, the client device(s) may include 5G-NR enabled electronic devices, Evolved-Universal Terrestrial Radio Access-New Radio) EN-DC enabled electronic devices, Transmission Mode 9 enabled electronic devices and LTE electronic devices. An EN-DC enabled electronic device can transmit and/or receive communication transmissions via a 5G-NR and an LTE air-interface technology (i.e. dual connectivity). Similarly, a Transmission Mode 9 (TM9) enabled electronic device is an electronic device configured with a transmission mode defined under the LTE air-interface technology but can also transmit and/or receive communication transmissions via a 5G-NR air-interface technology (i.e. dual connectivity).

Figure 2:
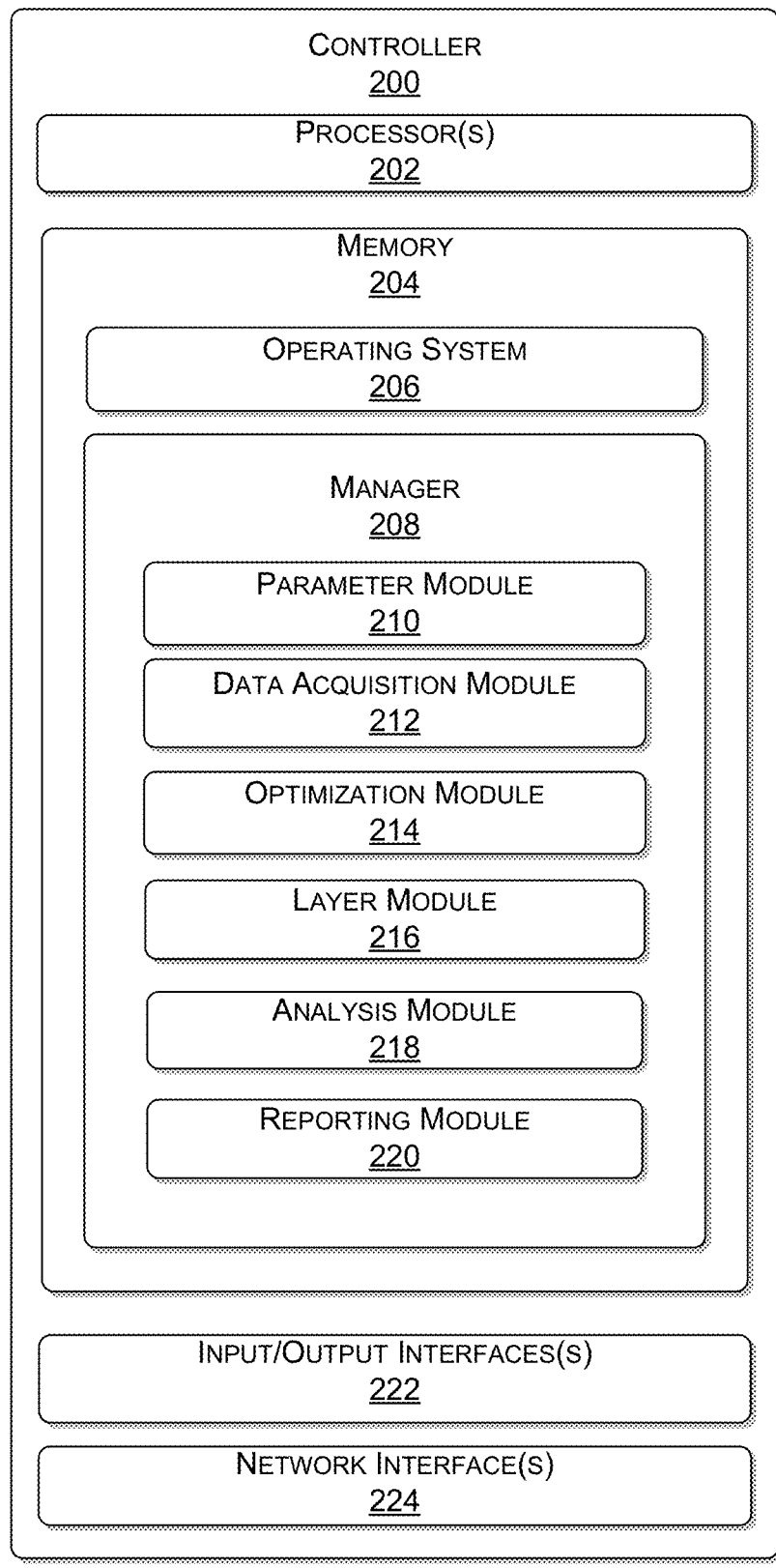
FIG. 2 is a block diagram showing various components of a controller in accordance with various embodiments.

FIG. 2 is a block diagram of an illustrative controller 200 for configuring a layer parameter and optimizing performance of cell sites. The controller 200 may be used to implement at least some of the functions of the central controller 110 of FIG. 1. Accordingly, controller 200 may include various modules that perform functions to send commands to base stations as well as other network elements in order to adjust layer parameters and optimize the performance of cell sites individually or collectively. In some embodiments, the controller 200 also creates and defines groups of cell sites, referred to herein as clusters, adds or assigns cell sites to the clusters, and performs optimizations to the cell sites 102(1) to 102(N) of each cluster to optimize the overall network performance. In various embodiments, the controller 200 may be hosted by one or more servers in a non-distributed configuration (e.g., server farm, etc.,) or a distributed configuration (e.g., cloud service, etc.).

The controller 200 may include one or more processors 202 and memory 204 that store various modules, applications, programs, or other data. The memory 204 may include instructions that, when executed by the one or more processors 202, cause the processors to perform the operations described herein for the controller 200 (e.g., the central controller 110). The memory 204 may include, but is not limited to, non-transitory memory that may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. In some embodiments, the memory 204 may include transitory signals, such as signals that a computer system or machine hosting or running a computer program can be configured to access, including signals downloaded through the Internet or other networks.

In the illustrated example, the memory 204 may include an operating system 206 and various applications, such as a manager 208 that may be used to generate commands for layer management and manage the performance of individual cell sites and/or clusters of cell sites. Execution of the manager 208 by the processor(s) 202 configures the controller 200 to perform various functions. In one embodiment, these functions may be controlled by different modules, such as a parameter module 210, a data acquisition module 212, an optimization module 214, a layer module 216, an analysis module 218, a reporting module 220, etc. The operating system 206 may be used to implement these modules. The operating system 206 may be any operating system capable of managing computer hardware and software resources. The modules discussed herein may include routines, program instructions, objects, and/or data structures that perform particular tasks or implement particular abstract data types.

The parameter module 210 may identify various parameters associated with the cell sites, referred to herein as KPI's. The parameters may include metrics, attributes, or other associated data for each cell site. Some of the parameters may be time-dependent, such as parameters that provide input/output data, service data, performance data (e.g., power used, dropped calls, etc.,). Other parameters may not be time dependent, such as location information, software specifications, hardware specifications, network attributes, etc. The parameter module 210 may identify available parameters and, in some instances, identify parameters that impact, drive, or are associated with key result areas to enable a correlation with one or more layer management parameters. The parameter module 210 may also identify parameters that impact, drive, or are associated with key result areas to enable optimization of network performance. In various embodiments, the parameter module 210 may receive input from a data source, such as a server that is configured to provide baseline information for individual cells, clusters of cells, and/or the entire wireless telecommunication network, similar to the data server 112 of FIG. 1. In some embodiments, the parameter module 210 may also receive user input, such as input from an administrator and/or engineer to assist in identification, analysis, or other tasks associated with the KPIs.

The data acquisition module 212 may retrieve the parameters from various sources. For example, the data acquisition module 212 may link tables maintained and updated by various servers, such as the data server 112. The acquisition module 212 may compile the parameters over a predetermined period of time. The acquisition module 212 may perform basic operations on the obtained data, such as calculate an average, a mean, a maximum value, a minimum value, and/or perform other calculations using the obtained data. The data acquisition module 212 may also retrieve network attributes from various servers, such as the data server 112, or from individual cell sites 102(1) to 102 (N), either directly or through servers such as the data server 112.

The optimization module 214 determines one or more parameters (or network attributes) to optimize (i.e., adjust) for each cell site individually. In some scenarios, the optimization module may be used to optimize one or more parameters of clusters of cell sites. The optimization module 214 may optimize each cell site and/or cluster of cell sites in different ways. For example, the optimization module 214 may increase a value or setting for a first parameter associated with a first cell site and may decrease a value or setting for a second parameter for a second cell site. In some embodiments, the optimization module 214 may make different adjustment based on the values of the parameters or KPI's of a cell site. For example, a first cell site may receive a first adjustment while a second cell sites may receive a second adjustment that is different than the first adjustment. In another example, a first cell site in the first cluster may receive a first adjustment while a second range of cell sites in the first cluster may receive a second adjustment that is different than the first adjustment.

The layer control module 216 may track and update various layer parameters of the network. The layer control module 216 may update layer parameters as needed and maintain an updated listing of all sites and their corresponding layer configuration. For example, the layer control module 216 may be configured to access a database of cell sites and their corresponding layer configuration. The layer control module 216 may further be configured to generate a commend to update a layer parameter.

The analysis module 218 may analyze performance of the cell sites and/or the various components of the wireless telecommunication network 100 following implementation of layer parameter adjustments and other changes. In various embodiments, the analysis module 218 may initiate retrieval of data from a data server 112 via the data acquisition module 212. For example, the analysis module 218 may refer to historic data of one or more cell sites to determine a baseline performance of one or more KPI's for the one or more cell sites. To that end, the analysis module 218 triggers the data acquisition module to interact with the data server 112 to retrieve stored historical data regarding the relevant one or more cell sites.

The reporting module 220 may report results of the performance of the cell sites and/or the various components of the wireless telecommunication network 100 following implementation of the layer configuration changes. The reporting module 220 may be used to trigger a subsequent refreshing of the layer configuration changes and other optimizations, or other tasks performed by the layer control module 216 or optimization manager 208 at predetermined intervals or in response to a trigger event.

In the illustrated example, the controller 200 may further include input/output interface(s) 222. The input/output interface(s) 222 may include any type of output interface known in the art, such as a display (e.g., a liquid crystal display), speakers, a vibrating mechanism, or a tactile feedback mechanism. Input/output interface(s) 222 also include ports for one or more peripheral devices, such as headphones, peripheral speakers, or a peripheral display. Further, the input/output interface(s) 222 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the controller 200 may further include one or more network interface(s) 224. The one or more network interface(s) 224 may include any sort of transceiver known in the art. For example, the one or more network interface(s) 224 may include a radio transceiver that performs the function of transmitting and receiving radio frequency communications via an antenna. In addition, the one or more network interface(s) 224 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the one or more network interface(s) 224 may include wired communication components, such as an Ethernet port or a Universal Serial Bus (USB).

Figure 3:
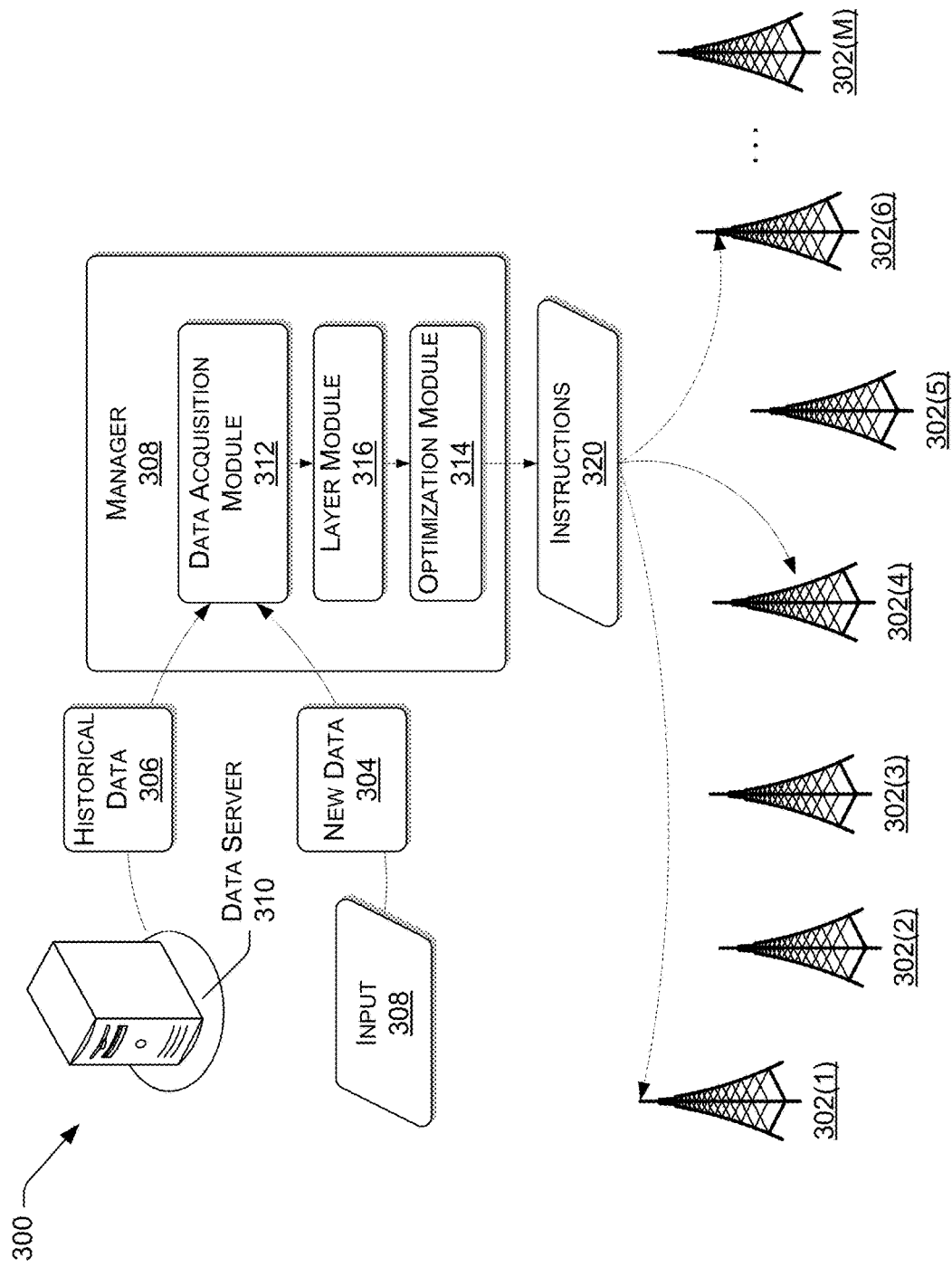
FIG. 3 is a diagram that shows an example architecture for implementing a wireless network system according to some embodiments.

Reference now is made to FIG. 3, which illustrates an example schematic diagram of a computing architecture 300 that can be used to perform various functions described herein, including adjusting a layer parameter. The architecture 300 may include a manager 308. For illustrative purposes, the manager 308 includes the data acquisition module 312, the layer module 316, and the optimization module 314, although the manager 308 may include other modules or data.

In accordance with various embodiments, the data acquisition module 312 may receive data from various data sources represented herein by data server 310. The data sources may include historical data 306 related to hardware, services, or other related data. In some instances, the historical data 306 may be located in separate tables, locations, and/or may be controlled or managed by other entities. For example, the historical data 306 may include customer survey information collected by a third party.

The data acquisition module 312 receives the historical data 306 from the data server 310 and provides the data to the layer management module 316 for managing changes to the layer parameters. The data acquisition module 312 may perform analysis of the data.

In some embodiments, the layer management module 316 may receive the data from the data acquisition module 312 and input 308. The input 308 may include data associated with the cell sites such as, and without limitation, an area of the radio network controller, baseline dates (time period), metrics, thresholds for the metrics, and/or other associated data, represented collectively as new data 304 in the example of FIG. 3.

In response to receiving the relevant data from the data server 310 and/or the input 308, the manager 308 may provide the gathered historical data 306 and the new data 304 to the layer management module 316 to determine correlations between the data and adjusted layer parameters. The manager 308 may also provide the gathered historical data 306 and the new data 304 to the optimization module 314 to optimize the performance of a cell site and/or the network. In one example, the optimization performed by the optimization module 314 may be with respect with an individual cell site (e.g., 302(4)) or a cluster (e.g., 302(1), 302(4) and 302(6)). For example, the optimization module 314 may receive data directly from the data acquisition module 312, and data from the layer management module 316 with information regarding the layer parameters that were adjusted. The optimization module 314 may perform the optimization to create instructions 320, which may be deployed to a cell site individually or to a cluster. The instructions 320 may include parameter changes, implementation instructions, scripts to perform the changes, and/or other data to deploy the optimization for each cell site individually or in aggregate (i.e., group) for a cluster.

Figure 4:
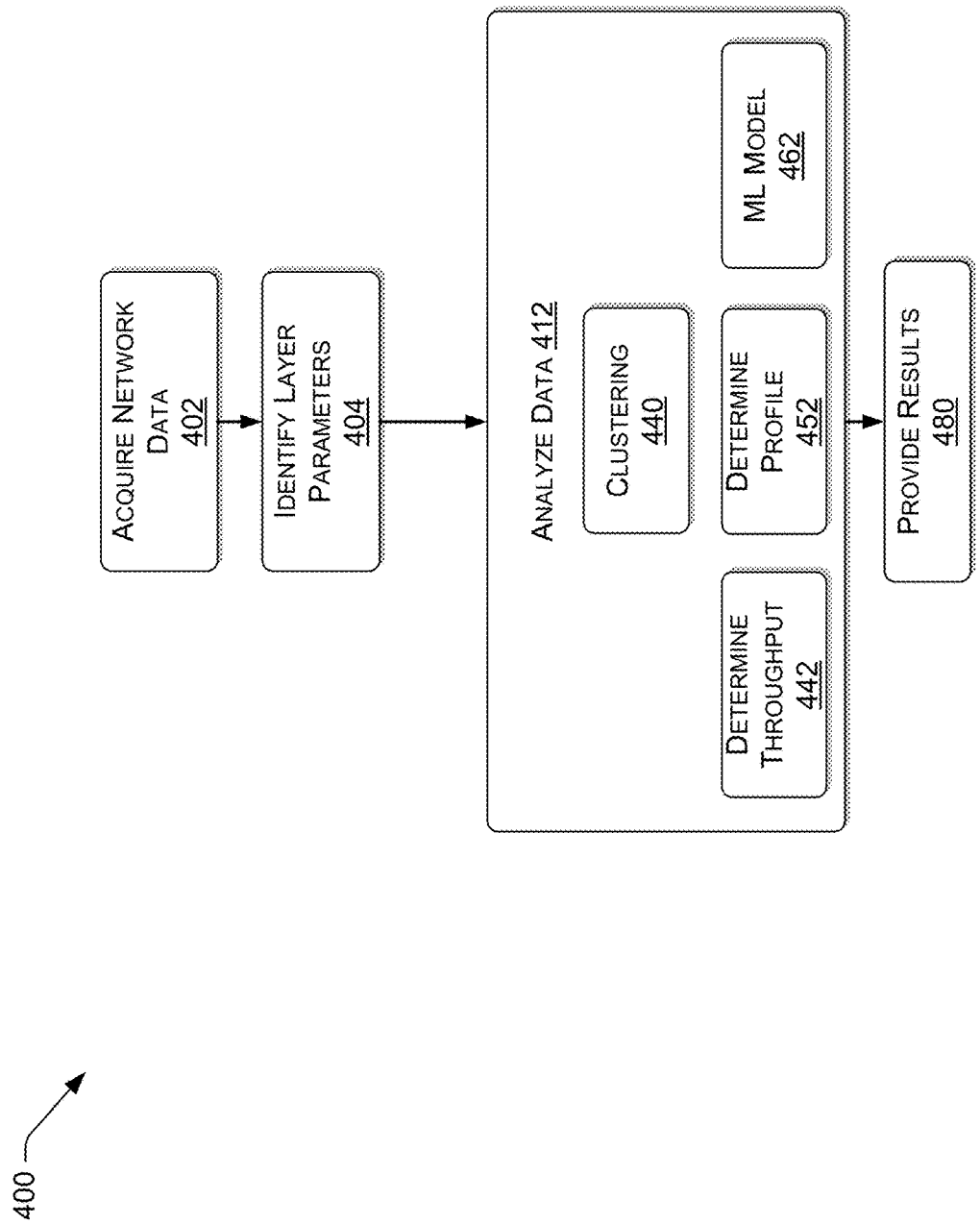
FIG. 4 is a functional diagram of an example process for layer management according to some embodiments.
Figure 5:
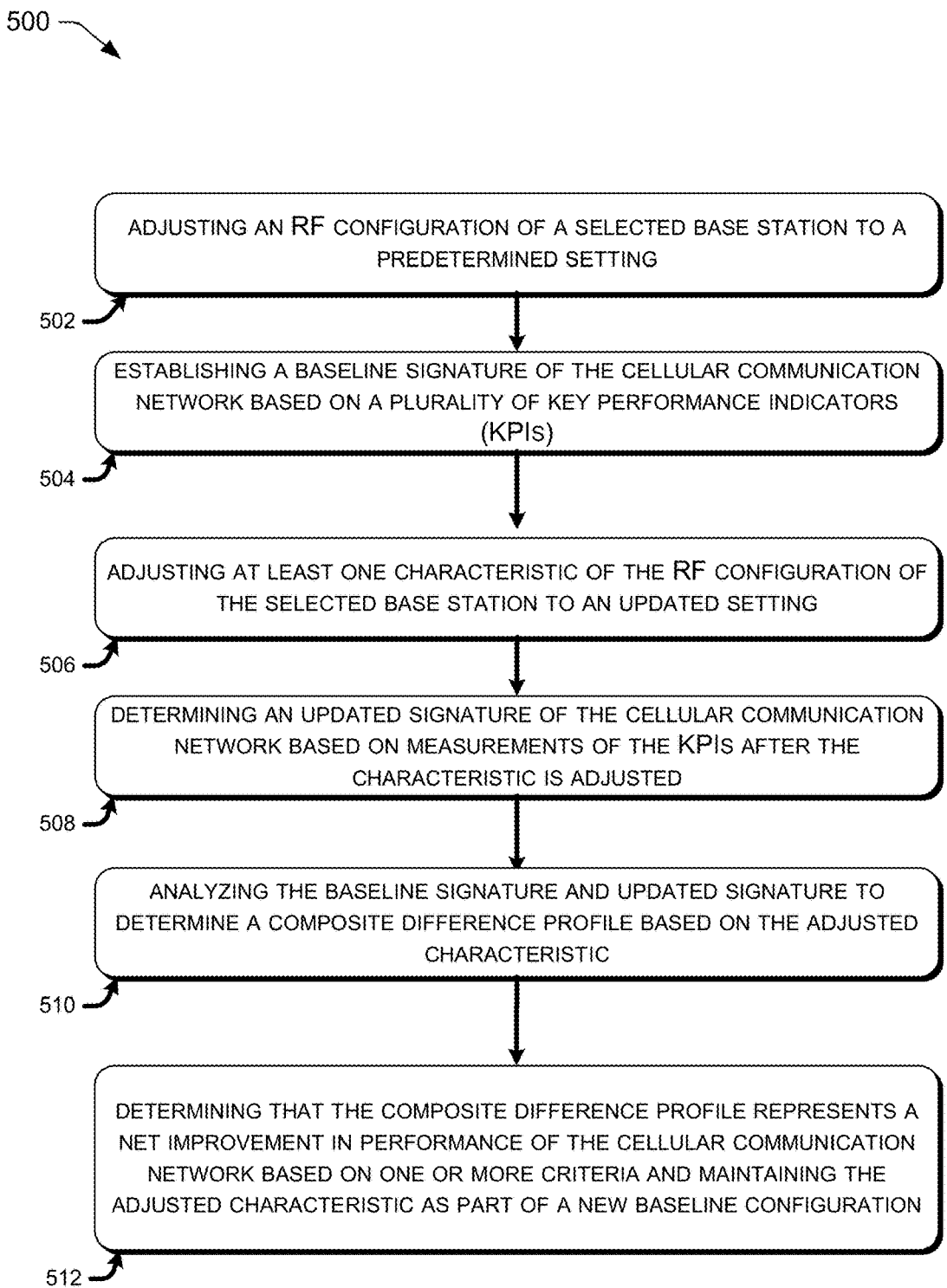
FIG. 5 is a flow diagram of an example process for layer management according to some embodiments.

With the foregoing overview of an example network 100 that facilitates the adjusting of one or more layer parameters of a cell site or a cluster of cell sites of FIG. 1, it may be helpful to provide some example processes. To that end, FIGS. 4 to 5 illustrate flow diagrams of example processes to adjust layer parameters, correlate adjusted parameters with metrics, and optimize the performance of a wireless telecommunication network. The processes are illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. For discussion purposes, the processes 400 and 500 are described with reference to the architecture 100 of FIG. 1, the controller 200 of FIG. 2, and the computing architecture of FIG. 3.

FIG. 4 is an example flow diagram 400 that may be implemented to effect layer management according to some embodiments. The flow diagram 400 may be implemented, for example, by manager 308. At block 402, the data acquisition module 312 of the manager 308 may receive historical data 306 and new data 304 from various sources, such as input 302 and the data server 310 of FIG. 3. The historical data 306 and/or the new data 304 can be used to create a baseline performance of a cell site, a group of cell sites, or a network. In one embodiment, the baseline performance may be based on KPI's of each individual cell site that have been stored in the data server 310 to indicate an average expected operation of the respective cell site for each KPI. In other embodiments, the KPI's may be based on new data 304, which is used to identify average KPI's for all cell sites or cell sites that were grouped together. In other embodiments, the KPI's are based on predetermined values that may have been programmed by an administrator of the wireless telecommunication network 100.

At block 404, the manager 308 identifies layer parameters to adjust. At block 412, the manager 308 may apply one or more instructions to analyze and/or modify various aspects of the identified parameters. In various situations, one or more functions may be implemented to acquire additional data, analyze the data, and determine correlations between the analyzed data and the adjusted parameters. At block 480, the results may be provided to allow the results to be stored in a data store, such as in a database of the controller 200. Various analytical methods may be used to determine correlations between KPIs and adjusted parameters. In one embodiment, clustering function 440 may be performed. In one embodiment, a K-Means Clustering Algorithm may be used for determining correlations between observed data and adjusted parameters. To reduce computational requirements, heuristic methods may be used to converge more quickly to solutions.

The KPIs that are collected and analyzed may vary according to the layer parameters that were adjusted. Some example KPIs include DL Traffic Volume, Cell DL Throughput, DI PRB Utilization, Average Connected Users, UE DL Throughput, Normalized UE DL Throughput, DL PRB Utilization, VOLTE Calls, VOLTE Drop Rate, LTE Data Drop Rate, Average UE DL Throughput, Average RSRP, and Average UL Path Loss.

In some embodiments, various operations may be performed such as operations for analyzing data throughput 442 and determining characteristic profiles 452. For example, analyzing data throughput 442 may be performed to measure downlink throughput for traffic associated with a cell site, which can be used to provide a statistically indicative measure of change due to a layer parameter. Determining characteristic profiles 452 may be performed to determine a profile associated with one or more cell sites after a layer parameter has been updated in some controlled manner, and one or more KPIs that have been collected after the update. The profile may be determined based on statistical information, which may include any combination of confidence scores, variance metrics, central tendency values, probability distribution functions, and the like. The profile may also be determined based on time-distributed data. In one example, a sample distribution may be determined based on a number of KPI samples collected over a predetermined time period.

In some embodiments, a machine learning model 462 may be implemented to determine correlations. In some configurations, the machine learning model may be configured to utilize supervised, unsupervised, or reinforcement learning techniques to generate correlations. For example, the machine learning model may utilize supervised machine learning techniques by training on the collected KPI data. In some embodiments, the machine learning model may also, or alternatively, utilize unsupervised machine learning techniques to determine correlations including, but not limited to, a clustering-based model, a forecasting-based model, a smoothing-based model, or another type of unsupervised machine learning model. In some embodiments, the machine learning model may also, or alternately, utilize reinforcement learning techniques to generate results. For example, the model may be trained using the input data and, based on feedback, the model may be rewarded based on its output.

In some embodiments, the KPI data may be analyzed to identify trends and patterns related to correlations. In one embodiment, the machine learning model may incorporate a classification function that may be configured to learn which diagnoses are relevant to various potential outcomes.

In some embodiments, an algorithm, such as a feature subset selection algorithm or an induction algorithm, may be implemented to define groupings or categories. One or more estimation methods may be incorporated, such as a parametric classification technique. In various embodiments, the machine learning model may employ a combination of probabilistic and heuristic methods to guide and narrow the data that are analyzed.

FIG. 5 is a flow diagram of an illustrative process 500 for implementing layer management according to some embodiments. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The routine 500 begins at operation 502, which illustrates adjusting a radio frequency (RF) configuration of a selected one of the plurality of base stations to a predetermined setting. In an embodiment, it is determined that the composite difference profile represents an undesirable change in performance of the cellular communication network based on the one or more criteria and adjusting the at least one characteristic of the RF configuration of the selected base station to a second adjustment. In some embodiments, the RF configuration comprises one or more of a frequency band selection, a ratio of a power allocation of at least two frequency bands, a channel bandwidth of one or more frequency bands, or a modulation scheme. Additionally or optionally, the RF configuration comprises a direction of a phased array antenna of the selected base station.

The routine 500 then proceeds to operation 504, which illustrates establishing a baseline signature of the cellular communication network based on a plurality of key performance indicators (KPIs) measured after the adjusting the RF configuration. In an embodiment, establishing a baseline signature comprises extracting KPIs over a predetermined time period and determining an average value for the KPIs for the predetermined time period. In some embodiments, establishing a baseline signature comprises extracting KPIs of a plurality of cell sites and determining an average value for the KPIs based on the plurality of cell sites.

In some embodiments, the KPIs comprise one or more of DL Traffic Volume, Cell DL Throughput, DI PRB Utilization, Average Connected Users, UE DL Throughput, Normalized UE DL Throughput, DL PRB Utilization, VOLTE Calls, VOLTE Drop Rate, LTE Data Drop Rate, Average UE DL Throughput, Average RSRP, or Average UL Path Loss.

Operation 506 illustrates, adjusting at least one characteristic of the RF configuration of the selected base station to an updated setting.

Operation 508 illustrates determining an updated signature of the cellular communication network based on measurements of the KPIs after the characteristic is adjusted.

Operation 510 illustrates analyzing the baseline signature and updated signature to determine a composite difference profile based on the adjusted characteristic. In an embodiment, a K-Means Clustering Algorithm is used for the analyzing.

Operation 512 illustrates determining that the composite difference profile represents a net improvement in performance of the cellular communication network based on one or more criteria and maintaining the adjusted characteristic as part of a new baseline configuration.

In an embodiment, the cellular communication network is a self-organizing network (SON). In one example, an instruction is sent to a SON controller to reconfigure the SON based on the determining that the composite difference profile represents a net improvement.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

It is understood that any specific order or hierarchy of steps in the process disclosed in FIGS. 4 and 5 are illustrations of exemplary approaches. Based upon design preferences, it is understood that the specific order or hierarchy of blocks in the processes may be rearranged, expanded, and some steps omitted. Some of the blocks may be performed simultaneously. For example, the action of load balancing and optimization of cellular coverage of FIG. 5 may occur concurrently or may be omitted.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The claims, description, and drawings of this application may describe one or more of the instant technologies in operational/functional language, for example, as a set of operations to be performed by a computer. Such operational/functional description in most instances can be specifically-configured hardware (e.g., because a general purpose computer in effect becomes a special purpose computer once it is programmed to perform particular functions pursuant to instructions from program software).

Although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language is to be read in its proper technological context, i.e., as concrete specifications for physical implementations.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for configuring a cellular communication network comprising a plurality of base stations, the method comprising:
    adjusting a radio frequency (RF) configuration of a selected one of the plurality of base stations to a predetermined setting;
    establishing a baseline signature of the cellular communication network based on a plurality of key performance indicators (KPIs) measured after the adjusting the RF configuration;
    adjusting at least one characteristic of the RF configuration of the selected base station to an updated setting;
    determining an updated signature of the cellular communication network based on measurements of the KPIs after the characteristic is adjusted;
    analyzing the baseline signature and updated signature to determine a composite difference profile based on the adjusted characteristic; and
    determining that the composite difference profile represents a net improvement in performance of the cellular communication network based on one or more criteria and maintaining the adjusted characteristic as part of a new baseline configuration.

2. The method of claim 1, further comprising:
    determining that the composite difference profile represents an undesirable change in performance of the cellular communication network based on the one or more criteria and adjusting the at least one characteristic of the RF configuration of the selected base station to a second adjustment.

3. The method of claim 1, wherein the RF configuration comprises one or more of a frequency band selection, a ratio of a power allocation of at least two frequency bands, a channel bandwidth of one or more frequency bands, or a modulation scheme.

4. The method of claim 1, wherein the RF configuration comprises a direction of a phased array antenna of the selected base station.

5. The method of claim 1, wherein the cellular communication network includes a self-organizing network (SON).

6. The method of claim 5, further comprising sending an instruction to a SON controller to reconfigure the SON based on the determining that the composite difference profile represents a net improvement.

7. A computing device configured to administer a wireless telecommunication network (WTN) having a plurality of cell sites, the computing device comprising:
    a processor;
    a network interface communicatively coupled to the processor and configured to enable communications with the WTN;
    a storage device coupled to the processor;

an application stored in the storage device, wherein execution of the application by the processor configures the computing device to perform acts comprising:
adjusting a radio frequency (RF) configuration of a selected one of the plurality of cell sites to a predetermined setting;
establishing a baseline signature of the WTN based on a plurality of key performance indicators (KPIs) measured after the adjusting the RF configuration;
adjusting at least one characteristic of the RF configuration of the selected cell site to an updated setting;
determining an updated signature of the WTN based on measurements of the KPIs after the characteristic is adjusted;
analyzing the baseline signature and the updated signature to determine a composite difference profile based on the adjusted characteristic; and
determining that the composite difference profile represents a net improvement in performance of the WTN based on one or more criteria and maintaining the adjusted characteristic as part of a new baseline configuration.

8. The computing device of claim 7, wherein establishing a baseline signature comprises:
extracting KPIs over a predetermined time period; and
determining an average value for the KPIs for the predetermined time period.

9. The computing device of claim 7, wherein establishing a baseline signature comprises:
extracting KPIs of a plurality of cell sites; and
determining an average value for the KPIs based on the plurality of cell sites.

10. The computing device of claim 7, wherein execution of the application by the processor configures the computing device to perform acts comprising:
determining that the composite difference profile represents an undesirable change in performance of the WTN based on the one or more criteria and adjusting the at least one characteristic of the RF configuration of the selected cell site to a second adjustment.

11. The computing device of claim 7, wherein the KPIs comprise one or more of DL Traffic Volume, Cell DL Throughput, DI PRB Utilization, Average Connected Users, UE DL Throughput, Normalized UE DL Throughput, DL PRB Utilization, VOLTE Calls, VOLTE Drop Rate, LTE Data Drop Rate, Average UE DL Throughput, Average RSRP, or Average UL Path Loss.

12. The computing device of claim 7, wherein the analyzing includes using a K-Means Clustering Algorithm to analyze the baseline signature and the updated signature.

13. A non-transitory computer-readable medium having stored thereon a plurality of sequences of instructions which, when executed by a processor, cause the processor to perform a method comprising:
receiving a first set of data comprised of substantially real-time data for a plurality of key performance indicators (KPIs) for a selected base station of a cellular communication network comprising a plurality of base stations;
based at least on the first set of data, determining a baseline signature of the cellular telecommunication network;
sending a command to adjust at least one characteristic of an RF configuration of the selected base station to an updated setting;
receiving a second set of data comprised of substantially real-time data for the plurality of KPIs;
determining an updated signature of the cellular communication network based on the second set of data;
analyzing the baseline signature and updated signature to determine a composite difference profile based on the adjusted characteristic; and
determining that the composite difference profile represents a net improvement in performance of the cellular communication network based on one or more criteria and maintaining the adjusted characteristic as part of a new baseline configuration.

14. The non-transitory computer-readable medium of claim 13, the method further comprising determining that the composite difference profile represents an undesirable change in performance of the cellular communication network based on the one or more criteria and adjusting the at least one characteristic of the RF configuration of the selected base station to a second adjustment.

15. The non-transitory computer-readable medium of claim 14, wherein the RF configuration comprises one or more of a frequency band selection, a ratio of a power allocation of at least two frequency bands, a channel bandwidth of one or more frequency bands, or a modulation scheme.

16. The non-transitory computer-readable medium of claim 14, wherein the RF configuration comprises a direction of a phased array antenna of the selected base station.

17. The non-transitory computer-readable medium of claim 14, wherein the cellular communication network includes a self-organizing network (SON).

18. The non-transitory computer-readable medium of claim 13, further comprising sending an instruction to a SON controller to reconfigure the SON based on the determining that the composite difference profile represents a net improvement.

19. The non-transitory computer-readable medium of claim 13, wherein the KPIs comprise one or more of DL Traffic Volume, Cell DL Throughput, DI PRB Utilization, Average Connected Users, UE DL Throughput, Normalized UE DL Throughput, DL PRB Utilization, VOLTE Calls, VOLTE Drop Rate, LTE Data Drop Rate, Average UE DL Throughput, Average RSRP, or Average UL Path Loss.

20. The non-transitory computer-readable medium of claim 13, wherein the analyzing includes using a K-Means Clustering Algorithm to analyze the baseline signature and the updated signature.

* * * * *